US007213244B2

(12) United States Patent
Chang et al.

(10) Patent No.: US 7,213,244 B2
(45) Date of Patent: May 1, 2007

(54) APPARATUS AND METHOD FOR DISTRIBUTION OF WORK ON A DOUBLY LINKED LIST AMONG PROCESSING THREADS

(75) Inventors: Joon Chang, Austin, TX (US); Jean-Philippe Sugarbroad, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 708 days.

(21) Appl. No.: 10/388,953

(22) Filed: Mar. 13, 2003

(65) Prior Publication Data

US 2004/0181504 A1    Sep. 16, 2004

(51) Int. Cl.
*G06F 9/52* (2006.01)
*G06F 9/44* (2006.01)
*G06F 7/00* (2006.01)

(52) U.S. Cl. .................. 717/161; 717/106; 707/101
(58) Field of Classification Search .......... 717/161, 717/106, 159; 707/101
See application file for complete search history.

(56) References Cited

U.S. PATENT DOCUMENTS

| | | | | |
|---|---|---|---|---|
| 5,197,146 A | * | 3/1993 | LaFetra | 711/144 |
| 5,805,892 A | * | 9/1998 | Nakajima | 717/131 |
| 5,924,098 A | * | 7/1999 | Kluge | 707/100 |
| 6,341,301 B1 | * | 1/2002 | Hagan | 718/100 |
| 6,529,983 B1 | * | 3/2003 | Marshall et al. | 710/200 |
| 6,732,194 B1 | * | 5/2004 | Kopylovitz et al. | 710/5 |
| 6,826,757 B2 | * | 11/2004 | Steele et al. | 719/314 |
| 6,862,635 B1 | * | 3/2005 | Alverson et al. | 710/52 |
| 6,983,452 B1 | * | 1/2006 | Willems | 717/128 |
| 7,017,160 B2 | * | 3/2006 | Martin et al. | 719/315 |
| 7,028,023 B2 | * | 4/2006 | Wang | 707/2 |
| 2004/0073553 A1 | * | 4/2004 | Brown et al. | 707/100 |

OTHER PUBLICATIONS

Cormen, Thomas H; Leiserson, Charles E; Rivest, Ronald L; "Introduction to Algorithms", 1990 Massachusetts Institute of Technology, p. 204-211.*
Gamma, Erich; Helm, Rihcard; Johnson, Ralph; Vlissides, John; "Design Patterns Elements of Reusable Object-Oriented Software", 1977 Addison-Wesley Publishing Company, p. 257-271.*
Thapar; Delagi; Flynn; "Linked List Cache Coherence for Scalable Shared Memory Multiprocessors", p. 34-43. 1993 IEEE.*
Leutenegger; Vernon; "The Performance of Multiprogrammed Multiprocessor Scheduling Policies", p. 226-236, 1990 ACM.*

* cited by examiner

*Primary Examiner*—Mary Steelman
(74) *Attorney, Agent, or Firm*—Duke W. Yee; Thomas E. Tyson; Lisa L. B. Yociss

(57) ABSTRACT

An apparatus and method for distributing work on a doubly linked list to a plurality of worker threads are provided. With the apparatus and method, an initial thread obtains the list lock for the linked list and inserts a marker element at the beginning of the linked list. Elements in the linked list that are before the marker element in the linked list are considered work that has been assigned or work that has been completed. Elements of the linked list that are after the marker element in the linked list are work to be done. The initial thread spawns worker threads to perform the work on the linked list and passes the address of the marker element to each of the worker threads. Each worker thread then operates independently to perform work on the linked list based on the current position of the marker element in the linked list.

20 Claims, 4 Drawing Sheets

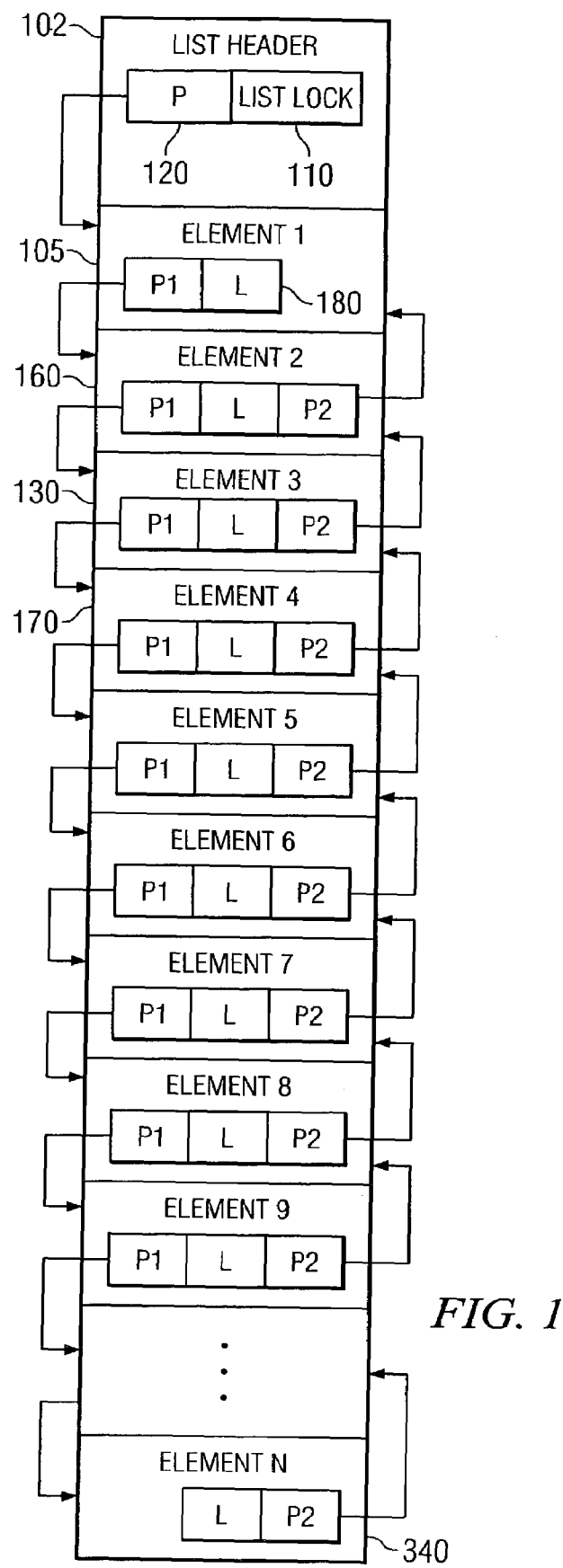
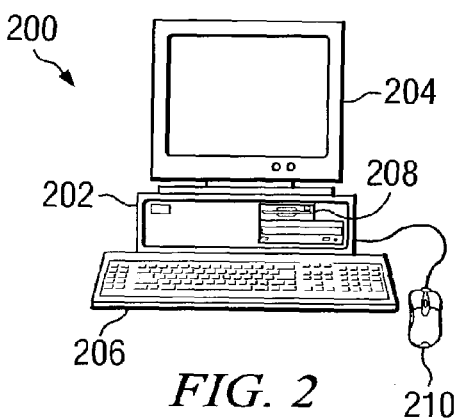
FIG. 1
FIG. 2

APPARATUS AND METHOD FOR DISTRIBUTION OF WORK ON A DOUBLY LINKED LIST AMONG PROCESSING THREADS

BACKGROUND OF THE INVENTION

1. Technical Field

The present invention is directed to an apparatus and method for distribution of work on a doubly linked list among processing threads. More specifically, the present invention is directed to a mechanism for maintaining information regarding work to be done, and work assigned or completed, by one or more processing threads.

2. Description of Related Art

Linked lists are data management mechanisms which allow for the organization of a sequential set of data in noncontiguous storage locations. In a standard linked list each element of the list contains a pointer to the next element in the list. Thus, each element is linked to the next element in the list. In a doubly linked list, each element in the doubly linked list includes a first pointer that points to the next element in the doubly linked list and a second pointer that points to the previous element in the doubly linked list.

FIG. 1 is an example graphical depiction of a doubly linked list. As shown in FIG. 1, the doubly linked list 100 includes a list header 102 and a plurality of list elements 105. The list header 102 includes a list lock 110 that protects the contents of the list and a pointer 120 to the first element 105 in the list. The plurality of elements 105 in the linked list each include a pair of pointers 140 and 150 that point to the element 160 before the current element 130 and the element 170 after the current element in the linked list 100. Each of the plurality of elements 105 further includes a lock 180 that protects the contents of the object itself. Before a process, e.g., a thread, may attempt to read or modify the contents of the linked list 100, the process must acquire the list lock 110. Multiple threads may read the list concurrently, but only one may modify the list at any one time.

Modifications of a linked list are of one of three types: add an element to the list, move an element in the list, or remove an element from the list. To add an element to the list, the element is created and its pointers 140 and 150 are set to point to the addresses of the elements of the linked list that are to be immediately before and after the new element. In addition, the pointers 140 and 150 of the elements before and after the new element must be modified to point to the new element.

To move an element in the list, the pointers of the element that is to be moved are modified to point to different elements in the list. The elements that were before and after the moved element are modified to point to each other and the elements that are now before and after the moved element are modified to point to the moved element.

To remove an element from the list, the element's pointers are modified to no longer point to an element in the list and the pointers of the elements before and after the element that is being removed are modified to point to each other.

In order to make the necessary modifications to the elements of the linked list to add, move, or remove these elements, the lock 180 on the element must first be obtained. Thus, in order to perform work, e.g., adding a new element, moving an element, removing and element, or modifying the element itself, the list lock 110 must be obtained and the lock on the element 180 must be acquired.

There have been a number of mechanisms devised for performing work on doubly linked lists. In one mechanism a single thread takes the list lock and walks the list, i.e. sequentially obtains the lock for each element of the list for which work is required, performing the necessary work on each element of the list. This approach to performing work on a doubly linked list does not scale and creates a bottleneck for processing involving doubly linked lists.

A second approach to performing work on a doubly linked list is to have multiple threads in which one is designated the "producer" thread and the remaining threads are the "consumer" threads. The producer thread holds the list lock through the work operations. As each consumer thread finishes work, it requests more work from the producer thread. The producer thread provides the requesting consumer thread with the address of the next element in the linked list, or instructs the consumer thread to terminate. Once all work is done, the consumer threads die off by being instructed to terminate by the producer thread. Once all of the consumer threads have died off, the producer thread releases the list lock. This mechanism may result in consumer threads queuing up on the producer thread and thereby slowing down the processing of the linked list.

In another mechanism for performing work on a linked list, a hash table is associated with the list. The hash buckets may be divided up amongst the threads performing work on the linked list, i.e. the worker threads. The worker threads, having been given the hash value range to work on, acquire list locks for each hash bucket in turn and do work on the contents of the linked list. This mechanism can result in an uneven distribution of work if the hash function is imperfect, as hash functions frequently are.

In view of the problems with the known mechanisms for performing work on a doubly linked list, it would be beneficial to have an apparatus and method for distributing work on a doubly linked list amongst a plurality of worker threads that does not require additional locks or data structures to be created and which scales up with processor performance. In addition, it would be beneficial to have an apparatus and method that distributes work evenly amongst the worker threads without the need for any kind of hashing or arbitration system.

SUMMARY OF THE INVENTION

The present invention provides an apparatus and method for distributing work on a doubly linked list to a plurality of work threads. With the apparatus and method of the present invention, when work is to be performed on a doubly linked list (hereafter referred to as the "linked list"), an initial thread obtains the list lock for the linked list and inserts a marker element at the beginning of the linked list. The marker element may be inserted by modifying the pointers of the marker element to point to the first element in the linked list and modifying the pointers of the first element and the header of the linked list to point to the marker element.

Under the scheme of the present invention, elements in the linked list that are before the marker element in the linked list are considered work that has been assigned or work that has been completed. Elements of the linked list that are after the marker element in the linked list are considered work to be done.

Once the marker element is inserted into the linked list, the initial thread spawns worker threads to perform the work on the linked list. The number of worker threads is implementation specific and any number of worker threads that may be determined to be necessary or desirable for performing the work on the linked list may be used without departing from the spirit and scope of the present invention.

The initial thread passes the address of the marker element to each of the worker threads.

Each worker thread then operates independently to perform work on the linked list based on the current position of the marker element in the linked list. That is, each worker thread first acquires the list lock for the linked list. The worker thread then exchanges the position of the marker element with the element following the marker element. This may be done, for example, by changing the pointers of the marker element and the pointers of the elements in the linked list that surround the marker element. By modifying these pointers in the marker element, it is not necessary for the worker thread to walk the list in its entirety since it has the address of the marker element stored and may determine what element is before and what element is after the marker element from the pointers contained therein.

The worker thread, having exchanged the position of the marker element with the element following the marker element, acquires the lock on the element that had been following the marker element but is now positioned immediately prior to the marker element in the linked list. The worker thread may then release the lock on the linked list and perform the necessary work on the linked list element just prior to the marker element.

When the worker thread is done performing the work on the element, the worker thread releases the lock and repeats the above operations until it is found that the marker element is at the end of the linked list. At this point, the worker thread exits or terminates. Once all worker threads have terminated, the initial thread that started the operation on the linked list may remove the marker element and return to the calling operation.

These and other features and advantages will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is an exemplary diagram of a doubly linked list;

FIG. 2 is an illustration of a computing device in which the present invention may be implemented;

DETAILED DESCRIPTION OF THE PREFERRED EMBODIMENT

Figure 3:
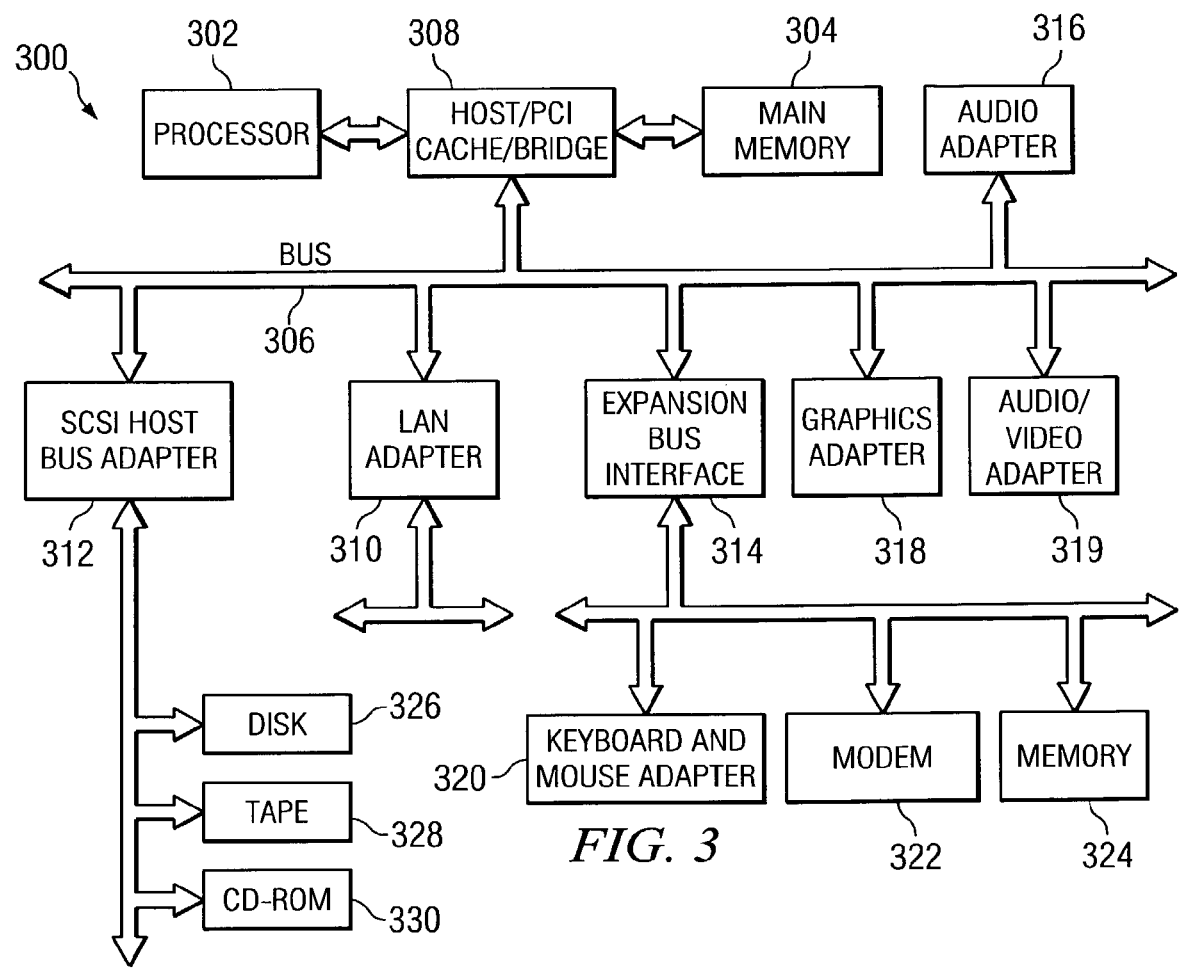
FIG. 3 is an exemplary block diagram of the primary operational components of a computing device in which the present invention may be implemented.

With reference now to the figures and in particular with reference to FIG. 2, a pictorial representation of a data processing system in which the present invention may be implemented is depicted in accordance with a preferred embodiment of the present invention. A computer 200 is depicted which includes system unit 202, video display terminal 204, keyboard 206, storage devices 208, which may include floppy drives and other types of permanent and removable storage media, and mouse 210. Additional input devices may be included with personal computer 200, such as, for example, a joystick, touchpad, touch screen, trackball, microphone, and the like. Computer 200 can be implemented using any suitable computer, such as an IBM eserver computer or IntelliStation computer, which are products of International Business Machines Corporation, located in Armonk, N.Y. Although the depicted representation shows a computer, other embodiments of the present invention may be implemented in other types of data processing systems, such as a network computer. Computer 200 also preferably includes a graphical user interface (GUI) that may be implemented by means of systems software residing in computer readable media in operation within computer 200.

With reference now to FIG. 3, a block diagram of a data processing system is shown in which the present invention may be implemented. Data processing system 300 is an example of a computer, such as computer 200 in FIG. 2, in which code or instructions implementing the processes of the present invention may be located. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, small computer system interface SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system such as Windows XP, which is available from Microsoft Corporation. An object oriented programming system such as Java may run in conjunction with the operating system and provides calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

For example, data processing system 300, if optionally configured as a network computer, may not include SCSI host bus adapter 312, hard disk drive 326, tape drive 328, and CD-ROM 330. In that case, the computer, to be properly called a client computer, includes some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a personal digital assistant (PDA), which is configured with ROM and/or flash ROM to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The processes of the present invention are performed by processor 302 using computer implemented instructions, which may be located in a memory such as, for example, main memory 304, memory 324, or in one or more peripheral devices 326–330.

It should be appreciated that, since linked lists allow for the organization of a sequential set of data in noncontiguous storage locations, these noncontiguous storage locations may be present on different machines. For example, the computing device described above with regard to FIGS. 2 and 3 may be a single computing device that is coupled to other computing devices by way of one or more wired or wireless networks. As such, the elements of a linked list may be distributed amongst these computing devices with the present invention being implemented by one or more of these computing devices or a separate computing device, such as a server.

As discussed previously, the present invention provides an apparatus and method for distributing work on a doubly linked list to a plurality of work threads. The present invention makes use of a marker element that is used to keep track of which elements of the linked list have been assigned to threads or have had their work completed and which elements of the linked list still require work to be done. Based on the position of this marker element in the linked list, worker threads may identify the next element in the linked list to be processed and when to terminate processing.

Figures 4A, 4B:
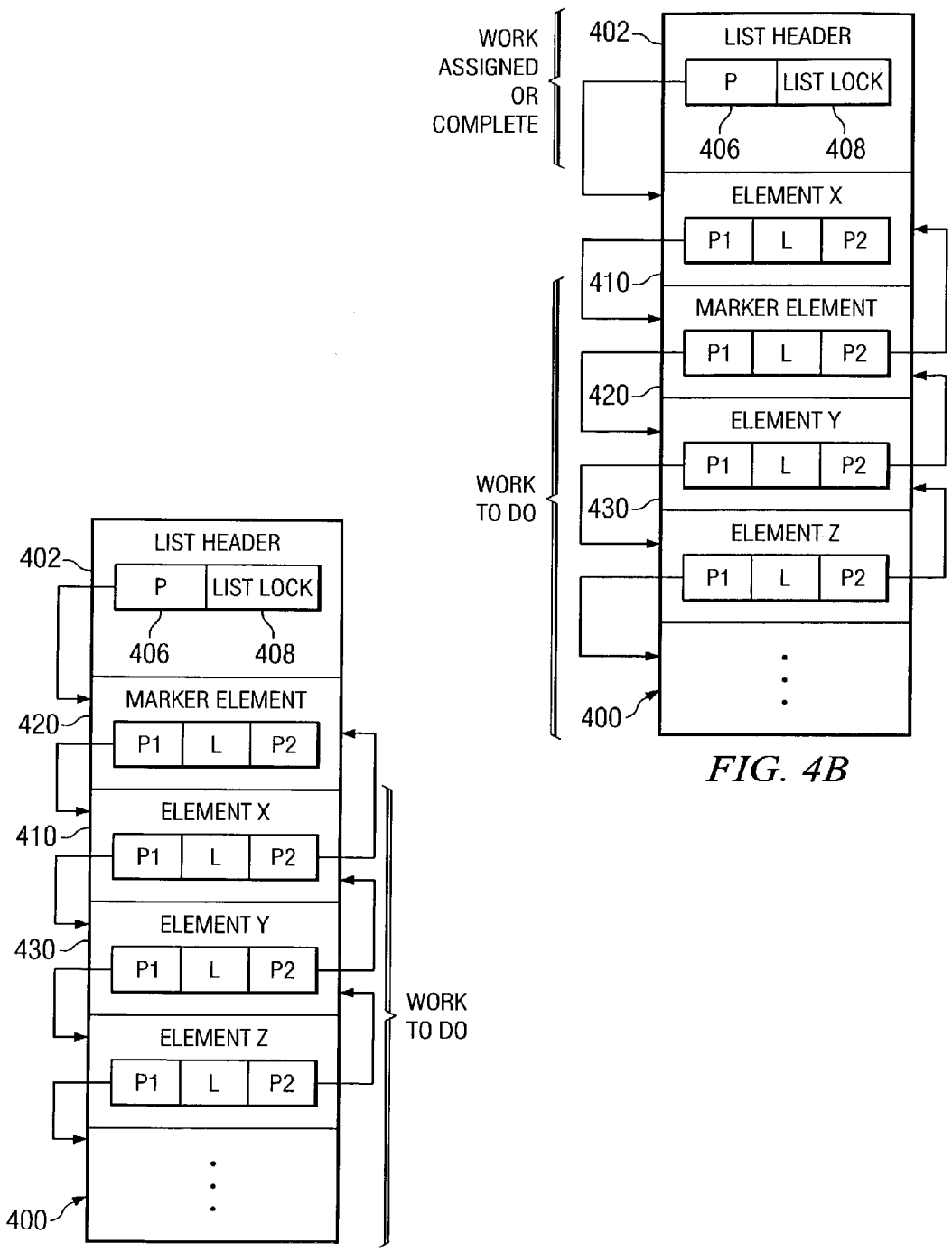
FIGS. 4A and 4B are exemplary diagrams illustrating the use of a marker element with a doubly linked list in accordance with the present invention.

FIGS. 4A and 4B are exemplary diagrams illustrating the use of a marker element with a doubly linked list in accordance with the present invention. As shown in FIG. 4A, with the apparatus and method of the present invention, when work is to be performed on a doubly linked list (hereafter referred to as the "linked list"), an initial thread obtains the list lock 408 for the linked list and inserts a marker element 420 at the beginning of the linked list 400.

The marker element 420 may be inserted by creating an element of the list, i.e. a marker element 420, and modifying the pointer P1 of the marker element 420 to point to the first element in the linked list and the pointer P2 of the marker element 420 to either point to null (for standard linked lists) or point to the last element in the linked list (for circular linked lists). That is, the pointers of the marker element 420 may be set to point to the same address as the pointer 406 of the list header 402. In addition, the pointer 406 of the list header 402 must also be modified to point to the new marker element 420 and the pointer P2 of element X 410 must be modified to point to the marker element 420.

Once the marker element 420 is inserted into the linked list 400, the initial thread spawns worker threads to perform the work on the linked list 400. The number of worker threads is implementation specific and any number of worker threads that may be determined to be necessary or desirable for performing the work on the linked list 400 may be used without departing from the spirit and scope of the present invention. The initial thread passes the address of the marker element 420 to each of the worker threads.

Each worker thread then operates independently to perform work on the linked list 400 based on the current position of the marker element 420 in the linked list 400. That is, each worker thread first acquires the list lock 408 for the linked list 400. The worker thread then exchanges the position of the marker element 420 with the element following the marker element, e.g., element 410 in FIG. 4A. In the example shown in FIG. 4A, this may be done, for example, by obtaining the lock L on the marker element 420, changing the pointer P1 of the marker element 420 to point to element Y 430 and changing the pointer P2 of the marker element 420 to point to element X 410.

In addition, the pointer 406 of the list header 406 is modified to point to element X 410 and the pointers of the elements X 410 and Y 430 are modified to point to the marker element 420. In other words, the pointer P1 of element X 410 is modified to point to the marker element 420, the pointer P2 of element X 410 is modified to point to either null or the last element of the linked list, the pointer P1 of element Y 430 remains unchanged and the pointer P2 of element Y 430 is modified to point to the marker element 420. The result of this "moving" of the marker element 420 is shown in FIG. 4B.

In this way, the marker element 420 is moved to be between elements X and Y. By modifying these pointers in the marker element 420, it is not necessary for the worker thread to walk the linked list 400 in its entirety since the worker thread has the address of the marker element 420 stored and may access the marker element 420 to determine what elements are before and after the marker element. With this information, the worker thread may determine which element is next to be worked on in the doubly linked list.

As shown in FIG. 4B, under the scheme of the present invention, elements in the linked list 400 that are before the marker element 420 in the linked list 400 are considered work that has been assigned or work that has been completed. Elements of the linked list 400 that are after the marker element 420 in the linked list 400 are considered work to be done. Thus, in the example shown in FIG. 4B, element X 410 is an element that has been assigned and elements Y and Z 430–440 are elements which still require work to be performed on them. Element X 410 is an element that is assigned because the work on element X is to be done by the worker thread that "moved" the marker element 420.

The worker thread, having exchanged the position of the marker element 420 with the element following the marker element 420, e.g. element X 410, acquires the lock on the element 410 that had been following the marker element 420 but is now positioned immediately prior to the marker element 420 in the linked list 400. The worker thread may then release the list lock 408 and perform the necessary work on the linked list element just prior to the marker element 420.

An example of the work that may be performed by worker threads using the present invention includes, but is not limited to, writing of files to a storage medium. For example, if the linked list is a list of files on a file system whose data has not yet been written to a storage medium, a "sync" operation may be used to write the data to the storage medium. In known systems, this "sync" operation would walk the list and write the data to the storage medium. However, with the present invention, write operations may be initiated in parallel and thereby, the throughput of the operation is increased.

When the worker thread is done performing the work on the element 410, the worker thread releases the lock on the element and repeats the above operations until it is found that the marker element 420 is at the end of the linked list 400. At this point, the worker thread exits, or terminates. Once all worker threads have terminated, the initial thread knows that all work on the linked list 400 has been completed. The initial thread may then remove the marker element from the linked list and may terminate by returning to the operation that called, or spawned, the initial thread.

Figure 5:
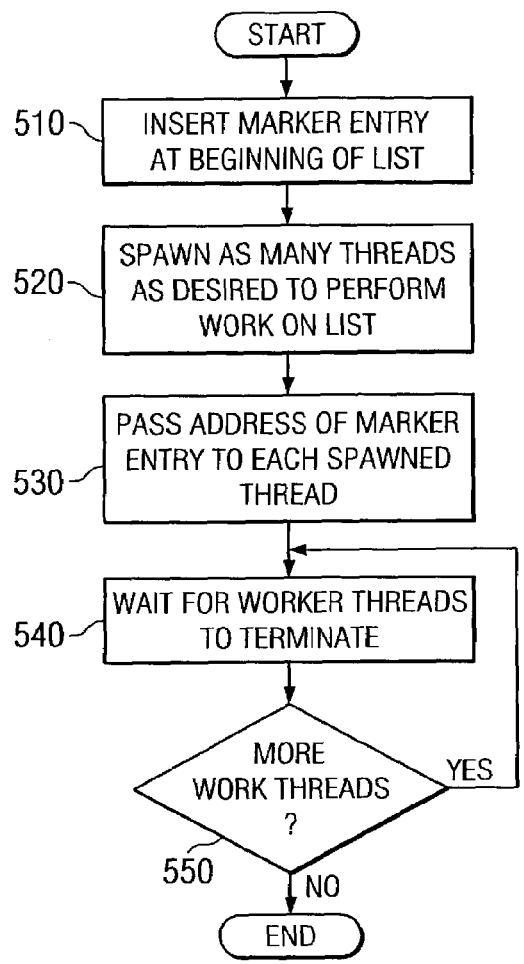
FIG. 5 is a flowchart outlining an exemplary operation of the present invention with regard to an initial thread.
Figure 6:
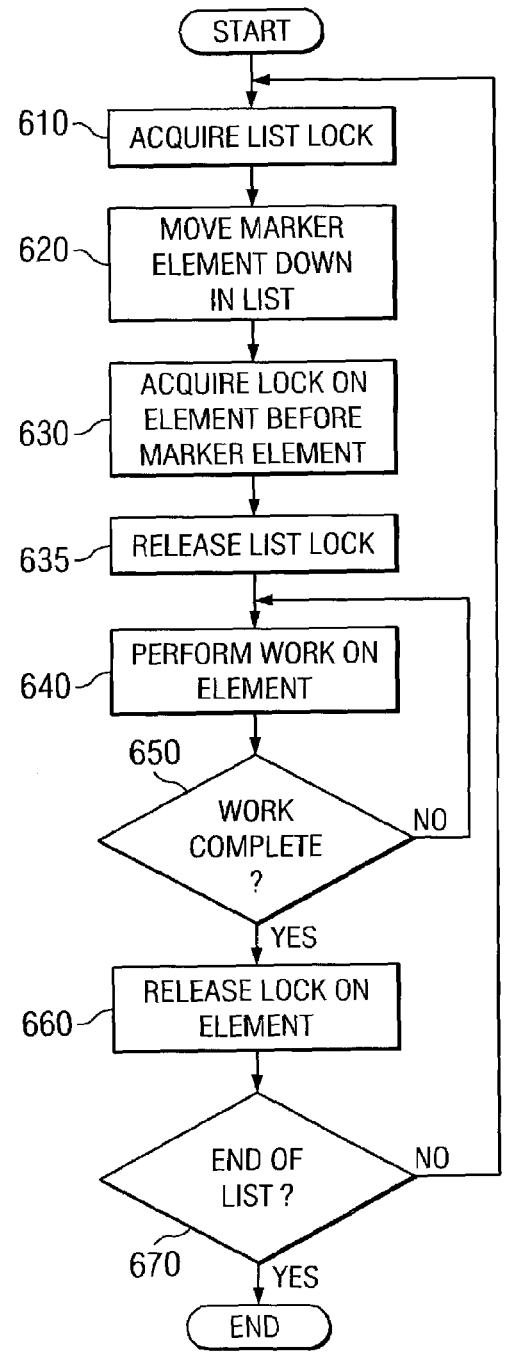
FIG. 6 is a flowchart outlining an exemplary operation of the present invention with regard to a worker thread.

FIGS. 5 and 6 are flowcharts that illustrate a mechanism for performing work on a doubly linked list according to the invention. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can he implemented by special purpose hardware-based computer systems which perform the specified functions or steps, or by combinations of special purpose hardware and computer instructions.

FIG. 5 is a flowchart outlining an exemplary operation of the present invention with regard to an initial thread. The process illustrated in FIG. 5 may be implemented in a data processing system, such as the exemplary data processing system illustrated in FIGS. 2 and 3. The process illustrated in FIG. 5 may be performed, for example, by an initial thread that is used to initiate work on a doubly linked list.

The process begins by inserting a marker element at the beginning of the list (step 510). The process spawns as many worker threads as desired to perform work on the linked list (step 520). The address of the marker entry is passed to each spawned worker thread (step 530). The process then waits for each spawned worker thread to return control back to the initial thread (step 540). A determination is made as to whether there are any more worker threads that have not returned control back to the initial thread (step 550). If so, the process returns to step 540; otherwise, the process terminates.

FIG. 6 is a flowchart outlining an exemplary operation of the present invention with regard to a worker thread. The process illustrated in FIG. 6 may be implemented in a data processing system, such as the exemplary data processing system illustrated in FIGS. 2 and 3. The process of FIG. 6 may be performed by each spawned worker thread spawned in step 520 of FIG. 5, for example.

The process begins by acquiring a list lock (step 610). The marker element is moved down in the linked list (step 620). The lock on the element that is before the marker element is acquired (step 630) and the list lock is released (step 635). The necessary work is then performed on the element for which the lock was obtained (step 640). A determination is made as to whether the work is complete (step 650). If the work is complete, the lock on the element is released (step 660). Next, a determination is made as to whether the end of the linked list has been reached (step 670). If the end of the linked list has been reached, the process terminates.

With reference again to step 670, if the end of the linked list has not been reached, the process returns to step 610 as described above. Referring again to step 650, if the work is not complete, the process returns to step 640 as described above.

Thus, the present invention provides a mechanism for distributing work to be done to a doubly linked list across a plurality of worker threads. The mechanism of the present invention is scalable, e.g., any number of worker threads may be spawned as desired, and avoids the bottlenecks experienced with known multiple thread approaches to performing work on linked lists. Moreover, the present invention does not require a hash table or other complex external mechanism for distributing work to multiple threads as in the known systems.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of modifying a doubly linked list that includes a plurality of elements, comprising:
    obtaining a list lock on the list which locks all of the plurality of elements;
    after obtaining the list lock, inserting a marker element into the doubly linked list, wherein the marker element becomes one of the plurality of elements of the doubly linked list;
    using the position of the marker element to identify ones of the plurality of elements for which work has been assigned; and
    moving the marker element through the doubly linked list as work is assigned to the plurality of elements.

2. The method of claim 1, further comprising:
    wherein work has been assigned for all of the plurality of elements that are located in the list before the marker element and work has not been assigned for all of the plurality of elements that are located in the list after the marker element.

3. The method of claim 1 further comprising;
    moving the marker element after a first element in the list;
    changing a first painter of the marker element to point to the first element; and
    changing a second pointer of the marker element to point to a second element in the doubly linked list that is at a position after the marker element in the hierarchy of the doubly linked list.

4. The method of claim 3, wherein moving the marker element further includes updating pointers of the first element and the second element to point to the marker element.

5. The method of claim 3, further comprising:
    performing work on the first element;
    in response to a completion of the work on the first element moving the marker element after the second element.

6. The method of claim 5, wherein inserting a marker element is performed by an initial thread, and wherein performing work on the first element is performed by a worker thread spawned by the initial thread.

7. The method of claim 1, further comprising:
    wherein inserting a marker element is performed by an initial thread;
    spawning, by the initial thread, a plurality of worker treads to perform work on the plurality of elements in the list;
    each one of the plurality of worker threads operating independently to perform work on the list based on the current position of the marker element in the linked list.

8. The method of claim 1, further comprising;
    obtaining an element lock on a first element, the element lock locking only the first element;
    releasing the list lock on the doubly linked list;
    performing work on the first element; and
    releasing the element lock on the first element.

9. The method of claim 1, further comprising:
    determining if there are elements in the doubly linked list that are below the marker element in the hierarchy of the doubly linked list; and
    moving the marker element down one position in the hierarchy of the doubly linked list at a time, if there are additional elements and performing work on the element immediately above the marker element until an end of the list is reached.

10. The method of claim 1, further comprising:
    wherein inserting a marker element is performed by an initial thread;
    spawning, by the initial thread, a plurality of worker threads to perform work on the plurality of elements in the list;
    wherein each of the plurality of worker threads perform the operations of moving the marker element.

11. A computer program product in tangible computer readable storage medium for modifying a doubly linked list that includes a plurality of elements, comprising:
    instructions for obtaining a list lock on the list which locks all of the plurality of elements;
    instructions for after obtaining the list lock, inserting a marker element into the doubly linked list, wherein the marker element becomes one of the plurality of elements of the doubly linked list;
    instructions for using the position of the marker element to identify ones of the plurality of elements for which work has been assigned; and
    instructions for moving the marker element through the doubly linked list as work is assigned to the plurality of elements.

12. The computer program product of claim 11, further comprising:
    wherein work has been assigned for all of the plurality of elements that are located in the list before the marker element and work has not been assigned for all of the plurality of elements that are located in the list after the marker element.

13. The computer program product of claim 11, further comprising:
    instructions for moving the marker element after a first element in the list;
    instructions for changing a first pointer of the marker element to point to the first element; and
    instructions for changing a second pointer of the marker element to point to a second element in the doubly linked list that is at a position after the marker element in the hierarchy of the doubly linked list.

14. The computer program product of claim 13, wherein the instructions for moving the marker element further include instructions for updating pointers of the first element and the second clement to point to the marker element.

15. The computer program product of claim 13, further comprising:
    instructions for performing work on the first element;
    in response to a completion of the work on the first element, instructions for moving the marker element after the second element.

16. The computer program product of claim 15, wherein the instructions for inserting a marker element are executed by an initial thread, and wherein the instructions for performing work on the first element are executed by a worker thread spawned by the initial thread.

17. The computer program product of claim 11, further comprising;
    wherein the instructions for inserting a marker element includes instructions for an initial thread inserting a marker element;
    instructions for the initial thread spawning a plurality of worker threads to perform work on the list;
    each one of the plurality of worker threads operating independently to perform work on the list based on the current position of the marker element in the linked list.

18. The computer program product of claim 11, further comprising:
    instructions for obtaining an element lock on a first element, the lock locking only the first element;

instructions for releasing the list lock on the doubly linked list;

instructions for performing work on the first element; and instructions for releasing the element lock on the first element.

19. The computer program product of claim 11, further comprising:

wherein the instructions for inserting a marker element include instructions for an initial thread inserting a marker element;

instructions for the initial thread spawning a plurality of worker threads to perform work on the plurality of elements in the list;

wherein each of the plurality of worker threads execute the instructions for moving the marker element.

20. An apparatus for modifying a doubly linked list that includes a plurality of elements, comprising:

means for obtaining a list lock on the list which locks all of the plurality of elements;

after obtaining the list lock, means for inserting a marker element into the doubly linked list, wherein the marker element becomes one of the plurality of elements of the doubly linked list;

means for using the position of the marker element to identify ones of the plurality of elements for which work has been assigned; and means for moving the marker element through the doubly linked list as work is assigned to the plurality of elements.

* * * * *